Figure 3:
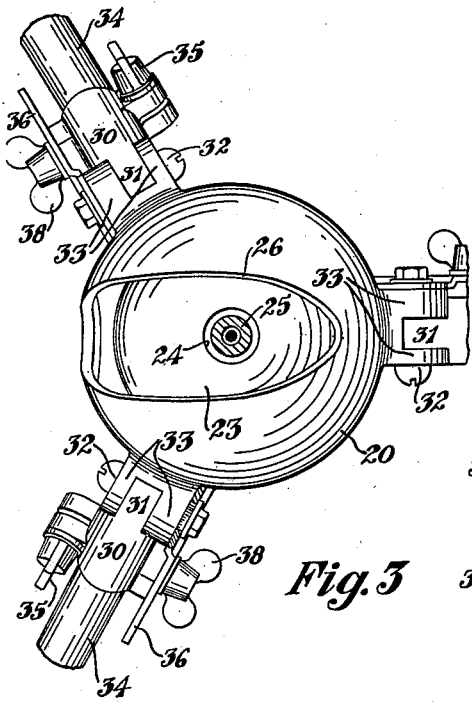

June 3, 1941.　　　　R. L. SWARTZ　　　　2,244,089

CAMERA TRIPOD

Original Filed Oct. 17, 1936

Inventor
Richey L. Swartz
By Frease and Bishop
Attorneys

Patented June 3, 1941

2,244,089

UNITED STATES PATENT OFFICE 2,244,089

CAMERA TRIPOD

Richey L. Swartz, Canton, Ohio, assignor of one-half to Kenneth B. Cope, Canton, Ohio Original application October 17, 1936, Serial No. 106,182, now Patent No. 2,171,870, dated September 5, 1939. Divided and this application December 20, 1938, Serial No. 246,812

3 Claims. (Cl. 248—181)

The invention relates to tripods especially adapted for use in supporting cameras, and the present application is a division of my co-pending application for Camera tripods, Serial No. 106,182, filed October 17, 1936, now Patent No. 2,171,870.

The ordinary camera tripod such as is in general use by photographers for supporting view cameras such as are commonly used for work outside of the studio comprises a table to which are detachably pivotally connected three legs usually formed of wood. Each leg is independently pivoted to the table and each is independently adjustable in length so as to compensate for unevenness in the ground upon which the tripod is supported as well as for tilting the table which supports the camera.

Such tripods are a continual source of annoyance to the photographers using the same for the reason that there is no positive means for holding the legs in adjusted position and it frequently happens that one leg of such a tripod will slip, causing the camera to fall, resulting in the destruction of or serious damage to valuable cameras and lenses.

The object of the present invention is to provide means for individually locking each leg of the tripod in adjusted position so as to hold the entire tripod rigid and prevent slipping of one leg upon the ground and the resultant overturning of the tripod and camera.

Another object is to provide means for tilting the table of the tripod to any desired angle without disturbing the position of the legs of the tripod, whereby the camera may be set at any necessary angle.

The above objects, together with others which will be apparent from the drawing and following description, or which may later be referred to, may be attained by constructing the improved tripod in the manner illustrated in the accompanying drawing, in which—

Figure 2:
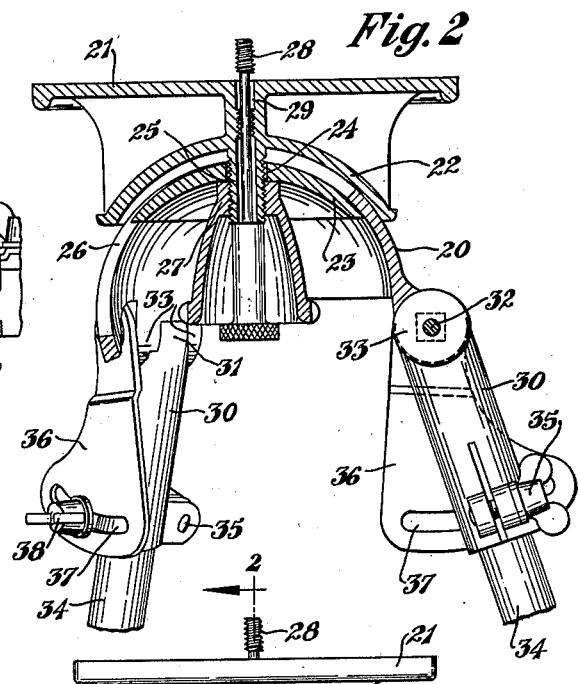
Figure 1:
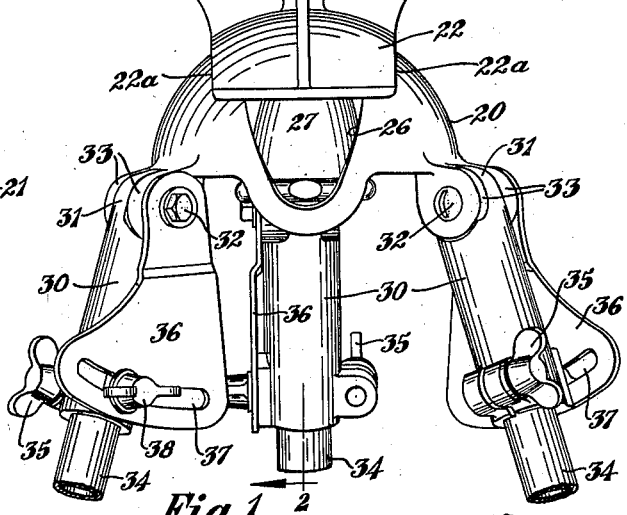

Figure 1 is a side elevation of the table and upper portions of the legs of the improved tripod showing the table tilting means;

Fig. 2, a section taken substantially on the line 2—2, Figure 1.

Fig. 3, a top plan view of the semi-spherical base; and

Figure 4:
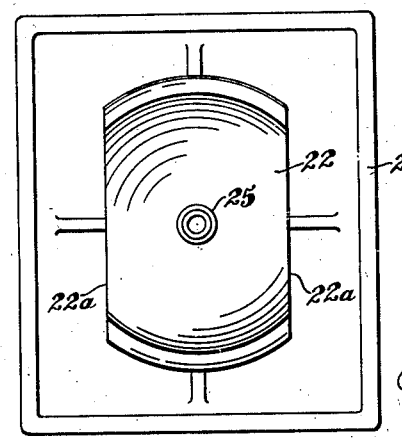

Fig. 4, a bottom plan view of the adjustable table.

Similar numerals refer to similar parts throughout the drawing.

The present divisional application discloses and claims a form of the invention in which the table of the tripod may be tilted to any desired angle and clamped in position without disturbing the adjustment of the legs.

For the purpose of uniformity the same reference numerals are applied to corresponding parts in the drawing and specification of this divisional application as are used in the above mentioned parent application.

In carrying out this form of the invention, a hollow semi-spherical base 20 is provided for the table 21 which has the cup 22 formed on its underside and adapted to receive the semi-spherical base 20, said cup being preferably cut away on opposite sides as indicated at 22a for a purpose to be later described.

A curved clamping plate 23 is adapted to fit within the semi-spherical base 20 and is provided with a central aperture 24 which receives the externally threaded hollow boss 25 depending from the table 21 and extended through the slot 26 in the semi-spherical base 20, which slot is of proper size and shape to permit of any required adjustment of the table relative to the base 20, a nut 27 being provided upon the threaded boss for clamping the table in adjusted position upon the base. The usual screw 28 for attaching the camera to the table of the tripod may be swiveled within a suitable bore 29 in the table and boss 25 in usual and well-known manner.

For the purpose of attaching the legs, sleeves 30 may be provided at their upper ends with lugs 31 pivotally connected as at 32 to the depending lugs 33 which may be formed integral with the base 20. The legs indicated at 34 may be in the form of metal tubes preferably of any usual and well-known telescoping arrangements, the upper ends thereof being adapted to be inserted within the pivoted sleeves 30 and fixed therein as by the thumb screws 35.

For the purpose of individually locking the legs in adjusted position, an arcuate ear or plate 36 may be formed integrally with or fixed to one lug 33 of each pair and provided with an arcuate slot 37 concentric with the corresponding pivotal point 32 and adapted to receive the screw 38 carried by the corresponding sleeve 30, for clamping the corresponding leg in adjusted position.

From the above it will be obvious that the legs may be attached to the pivoted sleeves 30 by means of the thumb screws 35, and the screw 38 tightened when each leg is adjusted to the desired position, whereby each leg may be independently adjusted and clamped in adjusted position, permitting the tripod to be set up upon uneven ground, or upon a polished floor or other surface with the table level or tilted at any desired angle, the entire tripod being rigidly clamped in the desired position so as to prevent accident causing damage to the camera supported thereon.

With this construction it will be seen that the tripod may be rigidly mounted upon any surface regardless of whether it be uneven or polished without danger of any of the legs slipping and upsetting the tripod and camera thereon. After the legs are properly adjusted and locked in position, the table 21 may be tilted to any desired or necessary position within the limits of the slot 26 and locked upon the base.

I claim:

1. A tripod including a semi-spherical base, legs pivotally attached to the base, a table having a cup portion fitting upon said semi-spherical base, the base having a slot therein, a curved clamping plate located within the base, and a clamping screw carried by the table and located through said slot and clamping plate for locking the table in adjusted position upon the base, spaced pairs of depending lugs upon the base, a leg pivoted between each pair of lugs, an ear carried by one lug of each pair and having an arcuate slot therein extending upwardly and outwardly from a point below the pivot, and a locking screw carried by each leg and received in the corresponding arcuate slot.

2. A tripod including a hollow base of complete half-spherical form, legs pivotally attached to the base, a table having an inverted cup portion fitting upon said half-spherical base, the base having an elongated arcuate slot therein which is substantially 180° in length, a curved clamping plate located within the base, and a clamping screw carried by the table and located through said slot and clamping plate for locking the table in adjusted position upon the base, said screw being of a diameter less than half the width of the slot.

3. A tripod including a base, a table adjustably mounted upon the base, spaced pairs of depending lugs upon the underside of the base, a substantially triangular ear rigidly supported by and depending from one lug of each pair, a leg pivotally connected between each pair of lugs, there being an arcuate slot in each ear concentric with the corresponding pivotal connection, and locking screws carried by the legs and received in said arcuate slots of the ears for independently locking each leg in adjusted position relative to the base.

RICHEY L. SWARTZ.